United States Patent [19]

Lalvani

[11] Patent Number: 5,007,220
[45] Date of Patent: Apr. 16, 1991

[54] NON-PERIODIC AND PERIODIC LAYERED SPACE FRAMES HAVING PRISMATIC NODES

[76] Inventor: Haresh Lalvani, 92 Horatio St., #3M, New York, N.Y. 10014

[21] Appl. No.: 282,991

[22] Filed: Dec. 2, 1988

Related U.S. Application Data

[63] Continuation of Ser. No. 36,395, Apr. 9, 1987, abandoned.

[51] Int. Cl.$^5$ ............................................. E04H 12/00
[52] U.S. Cl. ........................................ 52/311; 52/648; 52/DIG. 10; 403/174; 403/171
[58] Field of Search ............... 52/648, 236.1, 79.4, 52/280, 281, DIG. 10, 311; 403/171, 172, 174, 176, 178

[56] References Cited

U.S. PATENT DOCUMENTS

| | | | |
|---|---|---|---|
| 1,113,371 | 10/1914 | Pajean | 403/176 |
| 1,960,328 | 5/1934 | Breines | 52/236.1 |
| 2,909,867 | 10/1959 | Hobson | 403/174 |
| 2,936,530 | 5/1960 | Bowen | 403/171 |
| 3,563,581 | 2/1971 | Sommerstein | 287/54 |
| 3,632,147 | 1/1972 | Finger | 403/171 |
| 3,722,153 | 3/1973 | Baer | 52/81 |
| 3,733,762 | 5/1973 | Pardo | 52/236.1 |
| 3,918,233 | 11/1975 | Simpson | 52/81 |
| 3,974,600 | 8/1976 | Pearce | 52/81 |
| 4,113,256 | 9/1978 | Hutchings | 273/160 |
| 4,122,646 | 10/1978 | Sapp | 403/171 |
| 4,129,975 | 12/1978 | Gabriel | 52/650 |
| 4,133,152 | 1/1979 | Penrose | 52/311 |
| 4,183,190 | 1/1980 | Bance | 52/81 |
| 4,295,307 | 10/1981 | Jensen | 52/236.1 |
| 4,620,998 | 11/1986 | Lalvani | 52/311 |
| 4,679,961 | 7/1987 | Stewart | 403/176 |

FOREIGN PATENT DOCUMENTS

| | | | |
|---|---|---|---|
| 2305330 | 8/1973 | Fed. Rep. of Germany . | |
| 2461203 | 6/1976 | Fed. Rep. of Germany | 403/174 |
| 682854 | 6/1930 | France . | |
| 1169545 | 12/1958 | France | 52/311 |
| 79350 | 10/1962 | France | 52/79.4 |
| 1391973 | 2/1965 | France . | |
| 581277 | 8/1958 | Italy . | |
| 14255 | of 1911 | United Kingdom | 52/236.1 |
| 1283025 | 7/1972 | United Kingdom | 403/171 |
| 2159229 | 11/1985 | United Kingdom | 403/172 |

OTHER PUBLICATIONS

Scientific American, Jun. 1977, pp. 110-121.

*Primary Examiner*—Henry E. Raduazo
*Attorney, Agent, or Firm*—Roylance, Abrams, Berdo & Goodman

[57] ABSTRACT

A family of space frames formed from one or more parallel, planar layers, with each layer comprising a plurality of prismatic nodes arranged in a spaced, non-periodic or periodic, planar array and a plurality of struts coupling adjacent nodes together. Each node has top and bottom surfaces of the same configuration and p side surfaces interconnecting the top and bottom surfaces or any suitable shape derived from this configuration. P is any odd number greater than three or any even number greater than four. Adjacent layers are coupled via interconnecting struts that are perpendicular to each layer or tilted relative to each layer. Successive layers are the same or different. The space frames can also define, locate, and map out tiled surfaces or block-filled volumes.

22 Claims, 12 Drawing Sheets

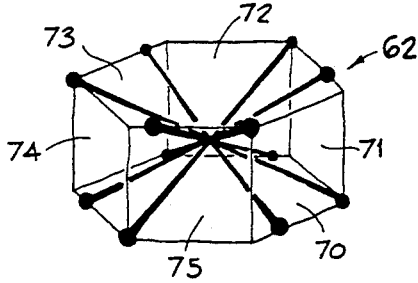
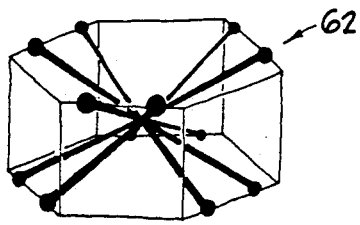

NON-PERIODIC AND PERIODIC LAYERED SPACE FRAMES HAVING PRISMATIC NODES

This is a continuation of U.S. application Ser. No. 07/036,395 filed Apr. 9 1987, now abandoned.

FIELD OF THE INVENTION

The invention relates to non-periodic and periodic space frames formed from a plurality of planar layers. Each layer has a plurality of prismatic nodes and a plurality of struts coupling the nodes in a non-periodic or periodic planar array. A set of interconnecting struts couples adjacent layers together. The space frames can also define, locate and map out tiled surfaces or block-filled volumes.

BACKGROUND OF THE INVENTION

Space frames in architecture and building technology are of a relatively recent origin and are characterized by a multitude of prefabricated modular elements that can be assembled in a variety of different ways to provide built-in design flexibility and economy in construction and manufacturing. Space frames have a spacial distribution of elements determined by their geometry and symmetry, and permit a large category of structures that depart from the orthogonal geometries common to conventional architecture. In addition to providing alternative geometries for enclosing space, there is an advantage in that their structural behavior is spacial, i.e., forces are distributed and carried spacially, and generally three dimensionally, resulting in greater performance for material weight input.

Two-dimensional space frames have been known for centuries and have been used as screens, space dividers, window lattices, door panels, ceilings, etc. These are all examples of planar space frames, and the best known examples occur as Islamic or Chinese lattices. Three-dimensional space frames in architecture have been known for several decades and can be traced to the works by Alexander Graham Bell, Buckminster Fuller, Robert LeRicolais, and Mengringhausen. In addition, there have been numerous patents granted on several types of two and three-dimensional space frames and structures. Examples of these include U.S. Pat. No. 3,563,581 to Sommerstein; U.S. Pat. No. 3,722,153 to Baer; U.S. Pat. No. 3,918,233 to Simpson; U.S. Pat. No. 3,974,600 to Pearce; U.S. Pat. No. 4,113,256 to Hutchings; U.S. Pat. No. 4,129,975 to Gabriel; U.S. Pat. No. 4,133,152 to Penrose; U.S. Pat. No. 4,183,190 to Bance; and U.S. Pat. No. 4,620,998 to Lalvani. Related foreign patents include West German patent 2,305,330 to Alcalde Cilveti; French patents 682,854 to Doornbos et al and 1,391,973 to Stora; and Italian patent 581,277 to Industria Officine Magliana. The disclosures of these patents ar hereby incorporated herein by reference.

While construction of two and three-dimensional space frames is known in the prior art, their versatility has been generally limited to periodic geometric designs. That is, the nodes and struts forming the space frames tend generally to provide a repeating pattern. While these structures tend to provide reasonable support, they are limited in spacial appearance and structure.

Thus, there is a continuing need for different geometric designs in two and three-dimensional space frames.

SUMMARY OF THE INVENTION

Accordingly, a primary object of the invention is to provide a family of space frames formed from one or more parallel, planar layers which has a non-periodic or periodic geometric pattern.

Another object of the invention is to provide a family of space frames where each layer comprises a plurality of prismatic nodes arranged in a spaced, non-periodic or periodic, planar array and a plurality of struts coupling adjacent nodes to together.

Another object of the invention is to provide a family of space frames including a plurality of planar layers wherein the layers are interconnected via struts that are perpendicular to each layer or tilted relative to each layer.

Another object of the invention is to provide a family of space frames that can define surface tilings, blocks used to fill volumes, toys, games, teaching aids, model kits, partition systems, building systems, and furniture.

The foregoing objects are basically attained by providing a space frame, the combination comprising a plurality of prismatic nodes arranged in a first spaced, non-periodic, planar array, each of the prismatic nodes having a substantially continuous outer surface comprising a top surface, a bottom surface, and p-side surfaces having opposite edges, each of the side surfaces being coupled to the top and bottom surfaces, and being coupled to the two side surfaces on the opposite edges thereof; a plurality of struts located in the same plane as the planar array of prismatic nodes, each of the struts having opposite ends; and means, coupled to each of the struts and each of the prismatic nodes, for coupling the opposite ends of each strut to two adjacent prismatic nodes; wherein p is selected from the group consisting of the odd numbers greater than three and the even numbers greater than six.

Other objects, advantages and salient features of the present invention will become apparent from the following detailed description, which, taken in conjunction with the annexed drawings, discloses preferred embodiments of the present invention.

DRAWINGS

Referring now to the drawings which form a part of this original disclosure:

Figure 13A:
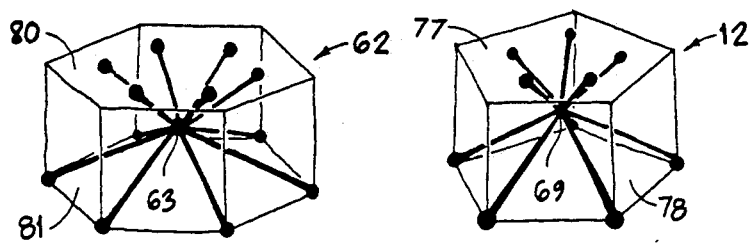
Figure 13B:
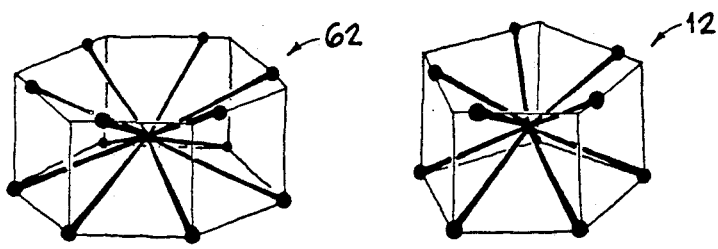
Figure 13C:
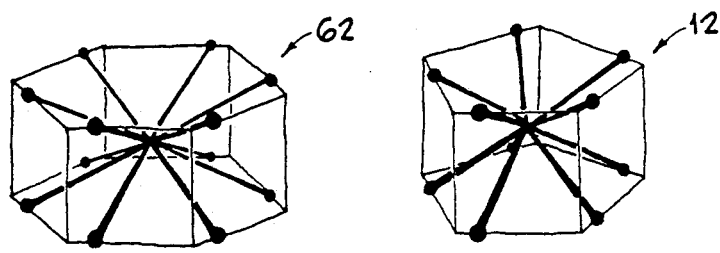
Figure 13D:
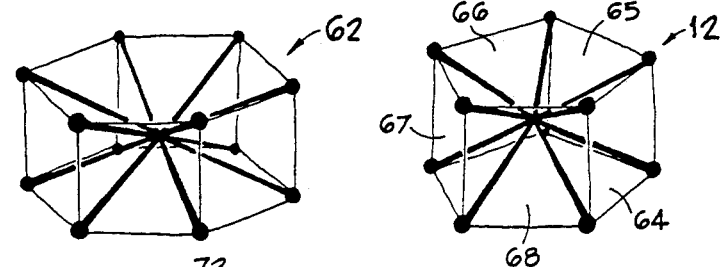
Figure 13E:
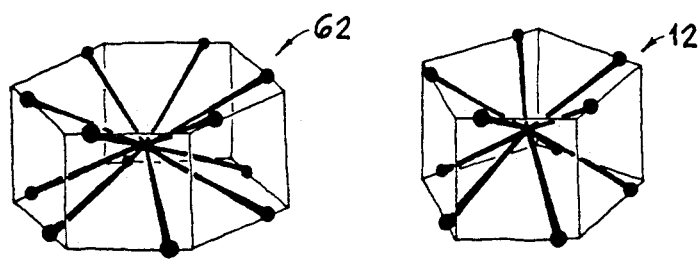
Figure 14A:
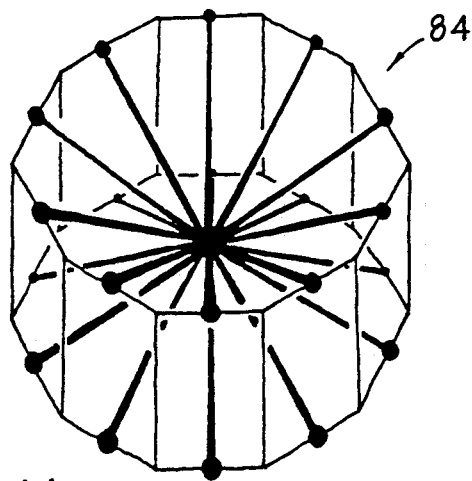
Figure 14D:
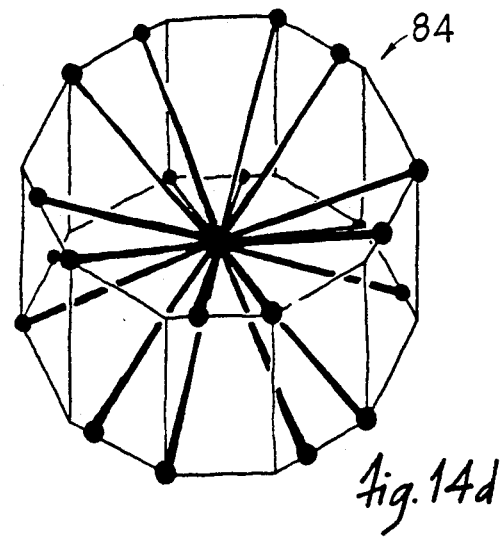
Figure 14B:
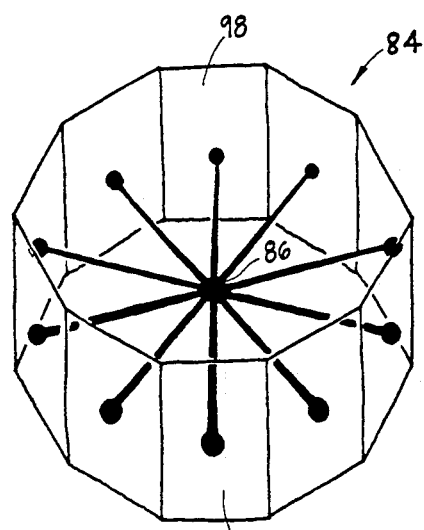
Figure 14E:
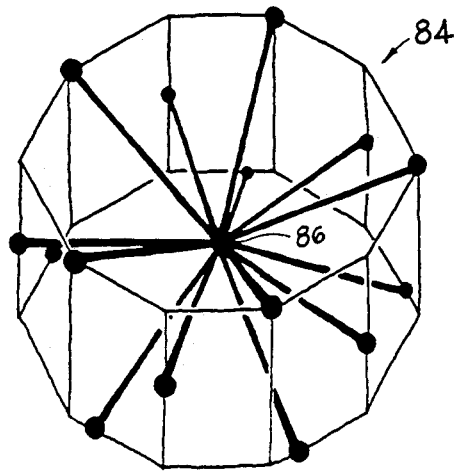
Figure 14C:
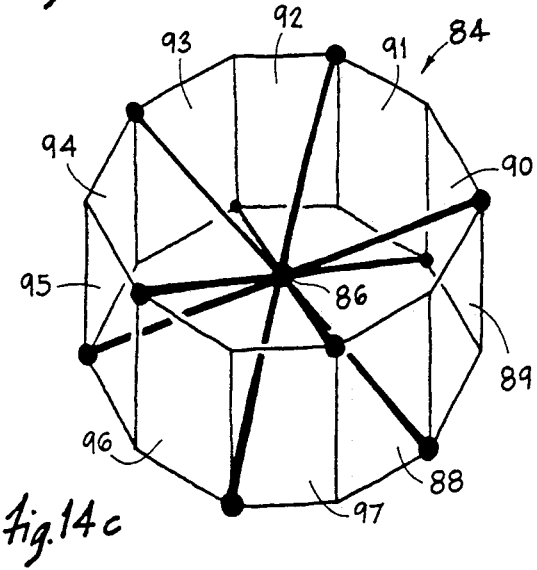
Figure 15:
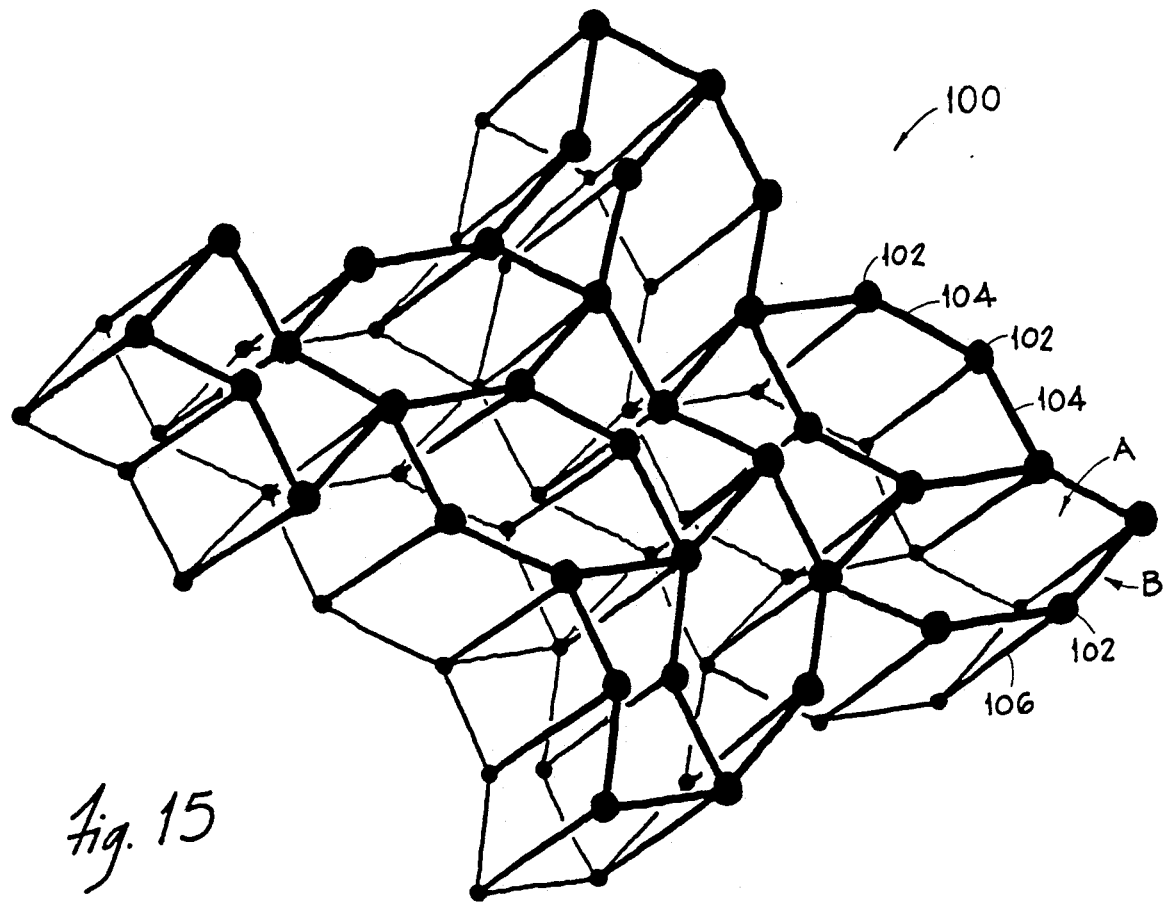
Figure 16:
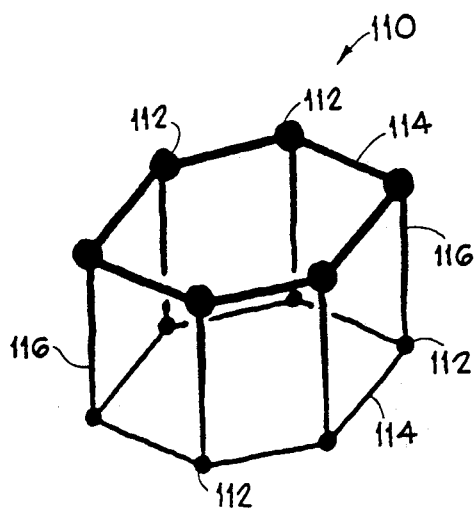
Figure 17:
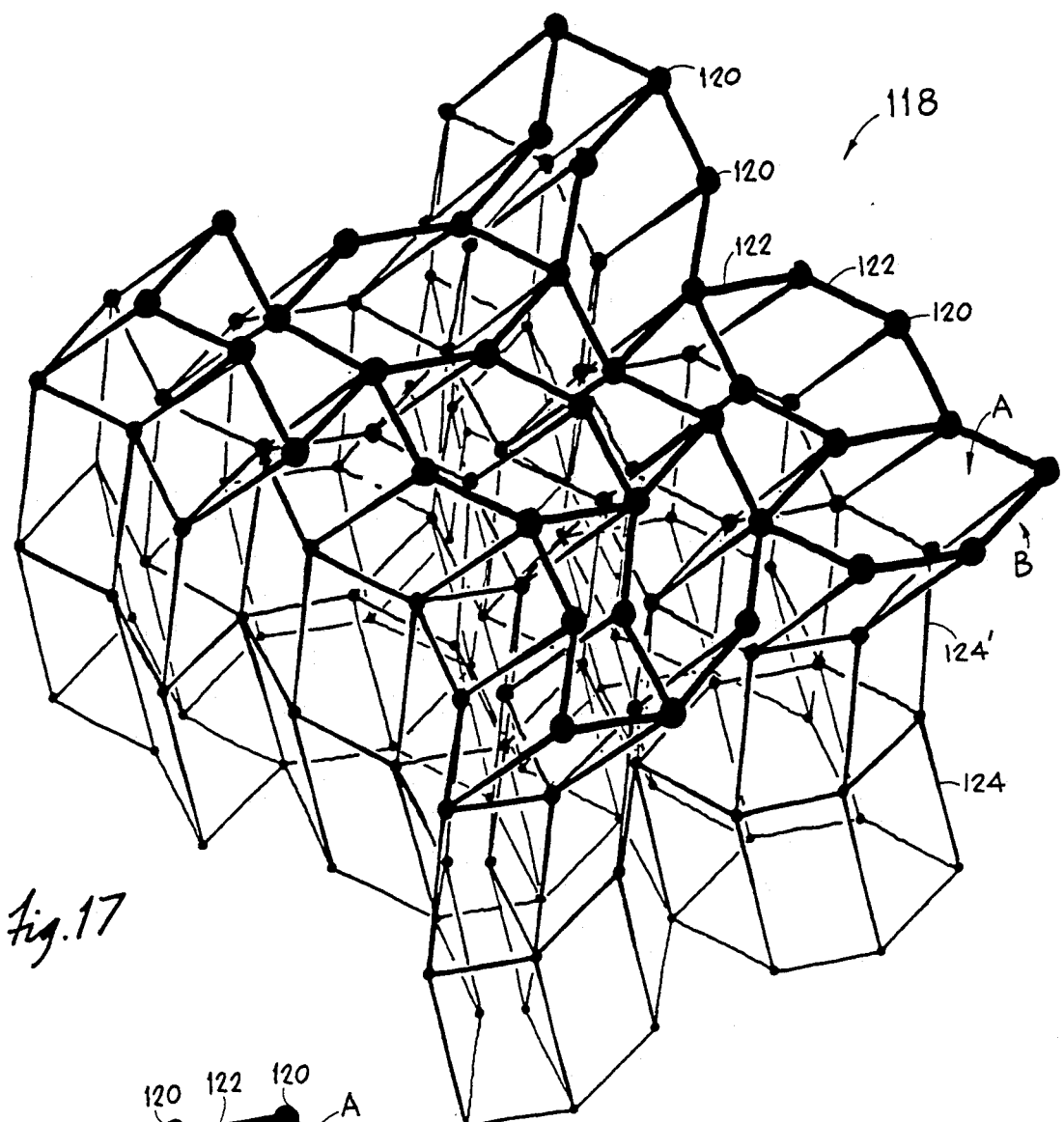
Figure 18:
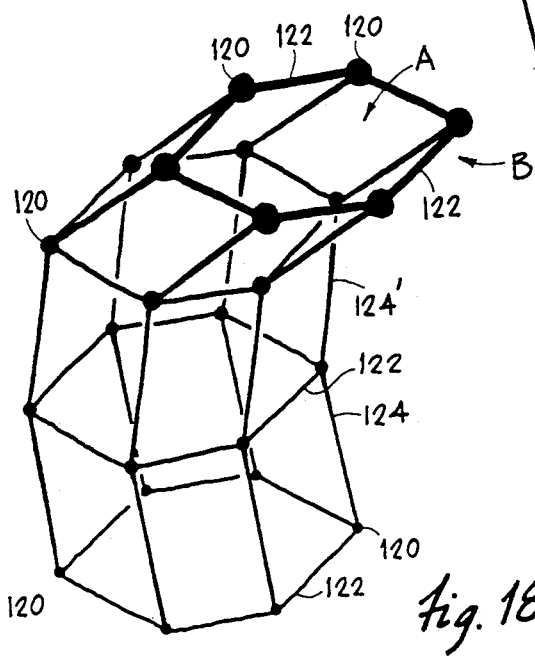
Figure 19:
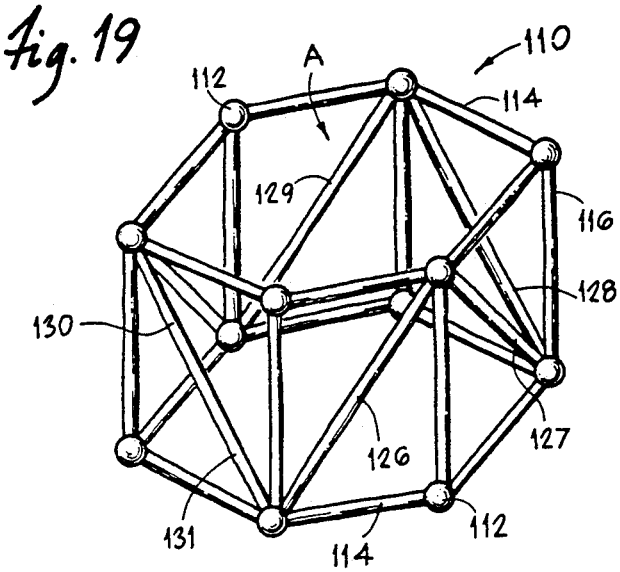
Figure 20:
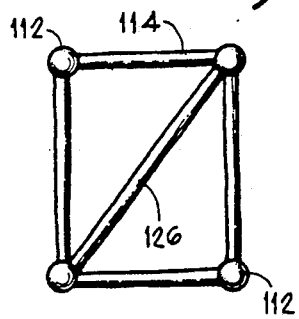
Figure 21:
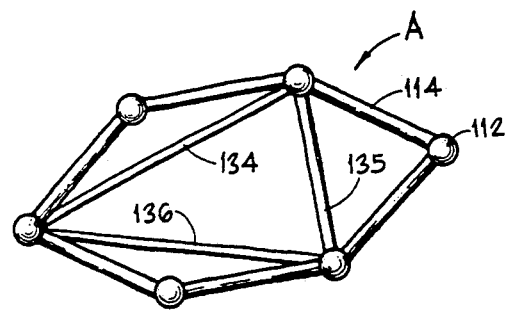
Figure 22:
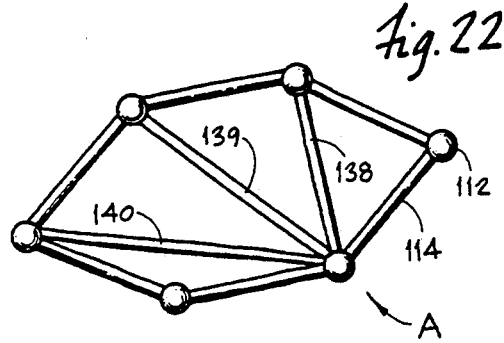
Figure 23:
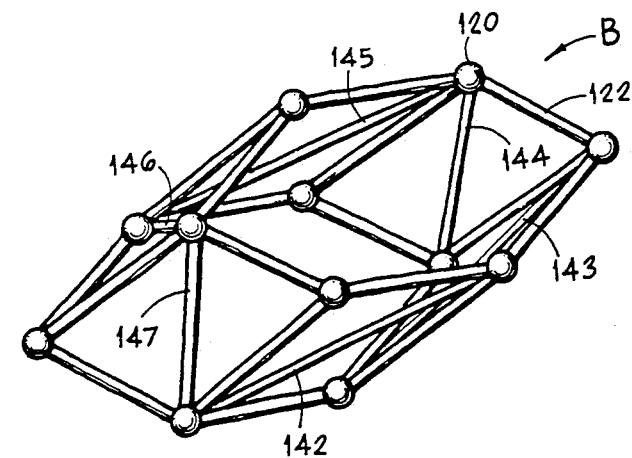
Figure 24:
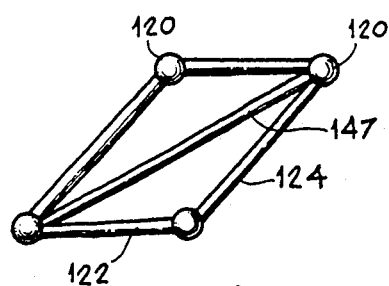

FIGS. 13a-e are diagrammatic illustrations of the five classes of symmetries of strut directions from odd-sided prismatic nodes, with 5-sided nodes being shown, the even-sided prismatic nodes also having these five classes of symmetries plus the two more shown in FIGS. 14c and 14d where the prismatic node is ten-sided;

FIGS. 14a-e are diagrammatic illustrations of five examples of strut directions from a 10-sided prismatic node, where FIGS. 14c and 14d show new symmetries possible only for even-sided nodes, Figs. 14a and 14b are variations of FIG. 13d for a 10-sided node, FIG. 14b is a planar two-dimensional node, and FIG. 14e is a hybrid combination of points with five points at the top, five points at the mid-plane, and five points at the bottom;

FIG. 15 is a diagrammatic perspective illustration of a double-layered space frame for 5-sided prismatic nodes with tilted interconnecting struts between layers;

FIG. 16 is a diagrammatic perspective illustration of a double-layered space frame similar to prism B shown in FIG. 15 except that the interconnecting struts are perpendicular to each planar layer, not tilted;

FIG. 17 is a diagrammatic perspective illustration of a non-periodic, multi-layered space frame with five-sided prismatic nodes and with each layer having interconnecting struts tilted differently;

FIG. 18 is a diagrammatic perspective illustration of a column of layers below hexagon A as seen in FIG. 17;

FIG. 19 is a perspective view of the right hexagonal prism in FIG. 16 with six diagonal bars on the sides thereof;

FIG. 20 is an elevational view of a diagonal bracing on one side of FIG. 19;

FIGS. 21 and 22 are top plan views of triangular bracing of hexagon A as seen in FIG. 17;

FIG. 23 is a perspective view of the tilted hexagonal prism B in FIGS. 15, 17 and 18 with diagonal bars;

FIG. 24 is a side elevational view of one parallelogram shown in FIG. 23; and

Figure 25:
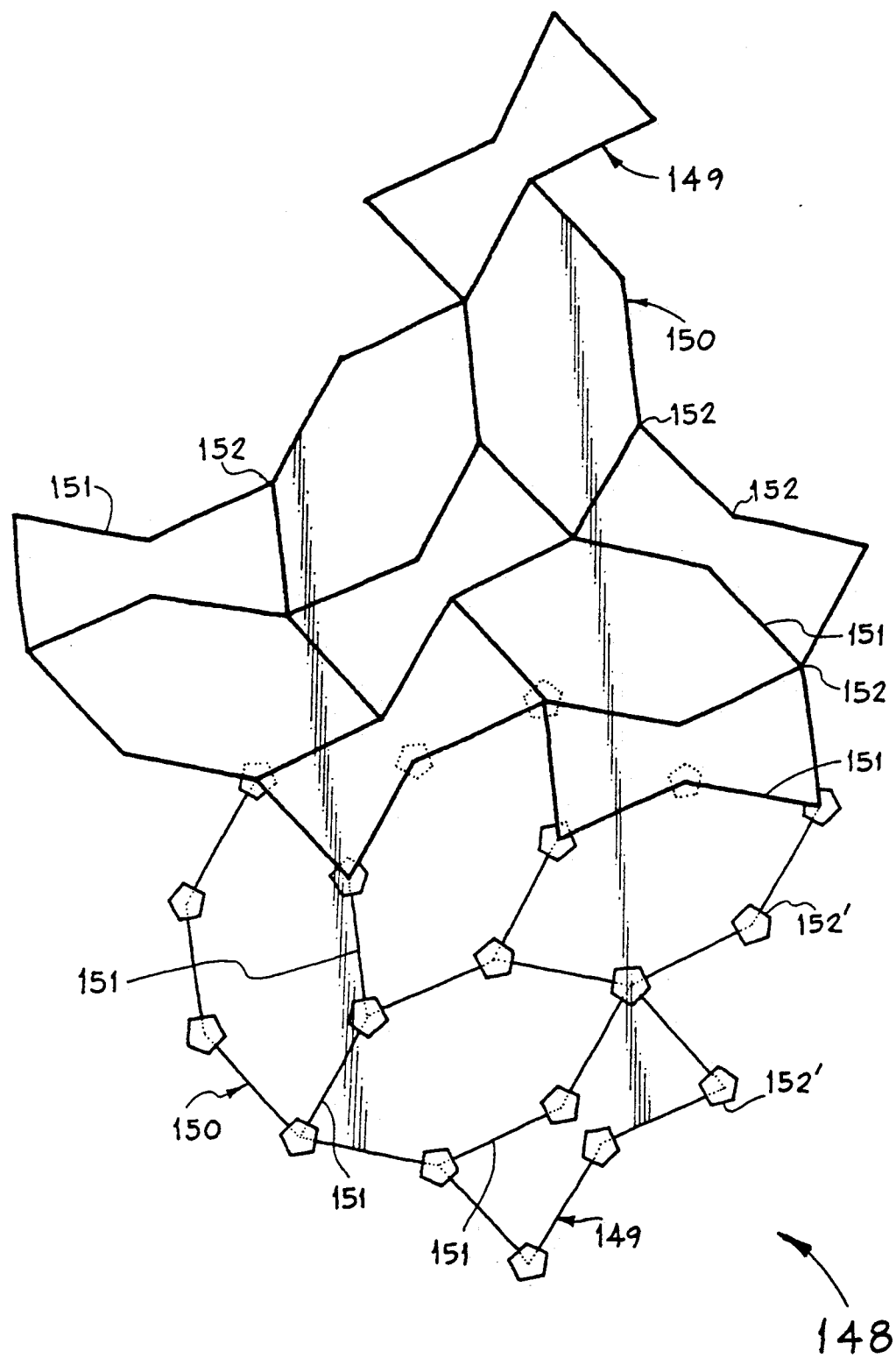

FIG. 25 is a top plan view of a tiled, continuous surface where the tile edges are defined by strut locations and the vertices between the edges are defined by node locations.

DETAILED DESCRIPTION OF THE INVENTION

The system or family of layered space frames in accordance with the invention comprises a plurality of prismatic nodes connected to each other by a plurality of struts to form two or three-dimensional space frames or structural frameworks. Each layer is planar and can be periodic or non-periodic and can be the same or different from the next layer. In addition, each layer can be connected to the next layer through perpendicular interconnecting struts or struts tilted at any arbitrary angle. The layers can be stacked periodically or non-periodically with the angle of connection between layers changing at every layer, i.e., the struts connecting the layers could do so periodically or non-periodically.

As used herein, an array is "periodic" if its pattern repeats and it has translational symmetry, i.e., where one section can be removed from the pattern, translated sideways, and precisely overlie and conform to an adjacent section. An array is "non-periodic" if its pattern does not repeat and it does not have translational symmetry.

The angles between the struts within a given layer and also between the layers are determined by various combinations of possible strut directions from p-sided prismatic nodes composed of top and bottom faces which are regular polygons with p sides, connected by p rectangles or squares. As used herein, a prismatic node means a node which is shaped as a prism and comprises top and bottom faces which are identical regular polygons with p sides, and p rectangles or squares forming side surfaces interconnecting the top and bottom surfaces. In addition, a prismatic node means any node having any shape or geometry derived from a prism and can include a sphere having strut directions derived from the prism geometry. Excluded from polyhedra and the 13 Archemedian solids, either with or without their corners being cut off.

The planar layers are either through the top surface of each prismatic node, through the mid-planes thereof, or through the bottom surface thereof and can comprise physical members in a plane or merely the nodes in a planar array.

As presented herein, for non-periodic arrays p is any odd number greater than 3 or any even number greater than 6, and for periodic arrays p is any odd number greater than 3 and any even number greater than 4.

The shape of each prismatic node can be the p-sided prism with appropriate strut directions marked by holes, protrusions, beveling of corners or edges of the prism or any suitable polyhedron derived from the prism or a sphere.

The nodes in one layer can be connected to one or several nodes in the layer above or below it and all strut lengths within a layer are advantageously equal in length, the length being measured from the center of each prism or may be unequal in length as determined by distances within the prism.

All strut lengths between two layers are equal to each other and may or may not equal those within a layer. The strut lengths between successive layers may or may not be equal and additional secondary struts may be introduced for stability purposes, for example, diagonals of rectangles or parallelograms, and other polygons or diagonals of prisms for the purpose of bracing or triangulating the space frames.

The areas bounded by the struts can be convex or non-convex polygons and can be empty or filled with polygonal panels, these polygons being the same within a layer or of several different polygonal shapes. These shapes can be abstract geometric shapes or representational figures. The number of struts at a prismatic node may vary from node to node in a non-periodic arrangement and can remain the same in a periodic arrangement.

The same prismatic nodes can produce an infinite variety of arrangements and the space frames can be disassembled and reassembled in various other arrangements. The connections between the struts and the nodes can be any fastening device such as adhesive, interlocking pieces, screws, or pins, mechanical or otherwise. The nodes can be cast in one or more pieces, or can be assembled from two or more pieces manufactured separately and coupled together by any known coupling mechanism. The struts can have any desired cross section and can be solid, hollow or tapered.

The directions of the struts can be derived from the following combinations of directions from the center of a p-sided prism:

(a) where the directions lie on the horizontal plane midway through the prism and include:
  (i) p directions of lines joining the mid-points of p rectangular faces,
  (ii) p directions joining the mid-points of p vertical edges,
  (iii) p directions of lines with a p-fold or 2p-fold symmetry, in any position between (i) and (ii),
  (iv) the p/2 directions of lines for p even only to mid-points of faces, edges or in-between,
  (v) any combinations of directions from (i), (ii), (iii) or (iv);

(b) to various positions on the top, bottom, or both regular p-gonal face of the prism:
  (i) p directions of lines to the p vertices of the polygon,
  (ii) p directions of lines to the p edges of the polygon,
  (iii) p directions of lines with p-fold or 2p-fold symmetry, in any position between (i) and (ii),
  (iv) one direction to the mid-point of the polygon,
  (v) p directions having p-fold or 2p-fold symmetry in any position between the mid-face and the vertex or edge of the polygon,
  (vi) p/2 directions for even p only to any in-between positions on the polygonal face or its edges, and
  (vii) any combinations of (i) through (vi) positions; or (c) to any combinations of positions described in (a) and (b).

The angle subtended by the side surface of each prismatic node to the center of the regular polygon with p sides equal $360°/p$. This is the angle between p struts with a p-fold symmetry when all struts lie on the mid-plane of the prism. When p struts with p-fold symmetry connect the center to any positions on the top or bottom polygon, this is the angle between their projections onto the mid-plane. The real angle between the struts can be derived by simple trigonometry when the height of the prism and the position of the struts on the polygonal faces is fixed.

Figure 1:
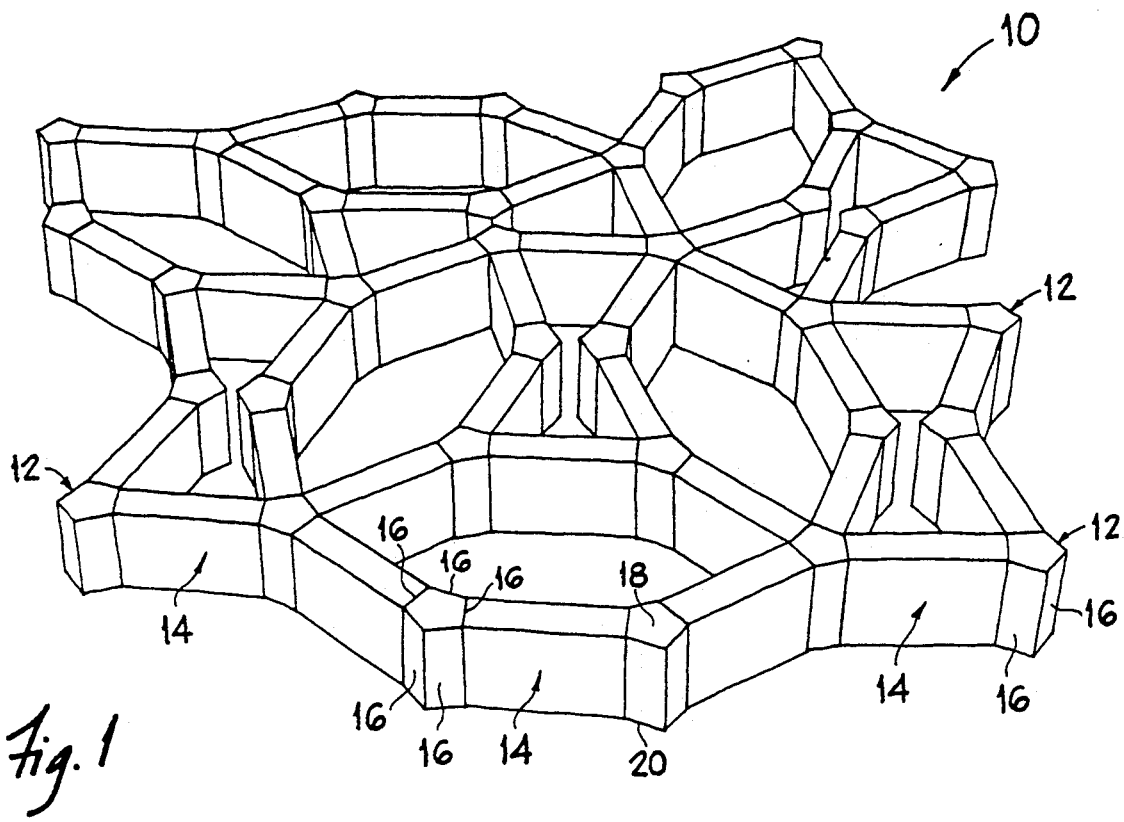
FIG. 1 is a perspective view of a two-dimensional space frame in accordance with the invention comprised of a plurality of five-sided prismatic nodes in a non-periodic planar array and a plurality of struts coupling the nodes together, the areas bounded by the struts forming convex and non-convex hexagons.

Referring now to the drawings, FIG. 1 illustrates a space frame 10 in accordance with the invention comprised of a plurality of five-sided prismatic nodes 12 in a non-periodic planar array and a plurality of struts 14 coupling the nodes together, the areas bounded by the struts forming convex and non-convex hexagons. As seen in FIG. 1, each prismatic node 12 has five side surfaces 16 and top and bottom surfaces 18 and 20 of identical configuration. Each of the side surfaces is coupled to the top and bottom surfaces and is coupled to the two side surfaces on the opposite edges thereof, forming a continuous outer surface.

Figure 2:
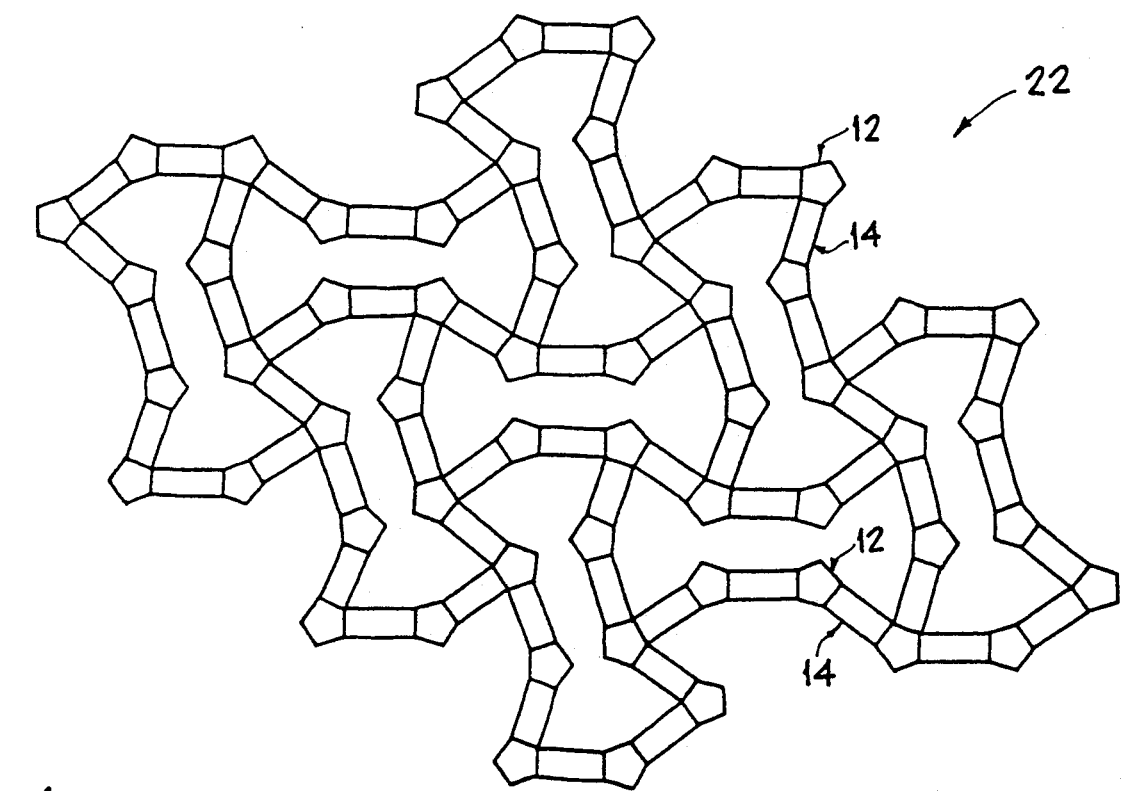
FIG. 2 is a top plan view of a two-dimensional space frame similar to that shown in FIG. 1 except that the areas bounded by the struts are ten-sided, the array is periodic, and the areas bounded by the struts are ten-sided, non-convex polygons of one type only.

As seen in FIG. 2, a modified two-dimensional space frame 22 is shown which is similar to that shown in FIG. 1 except that it is periodic and the areas bounded by the struts are all 10-sided.

Figure 3:
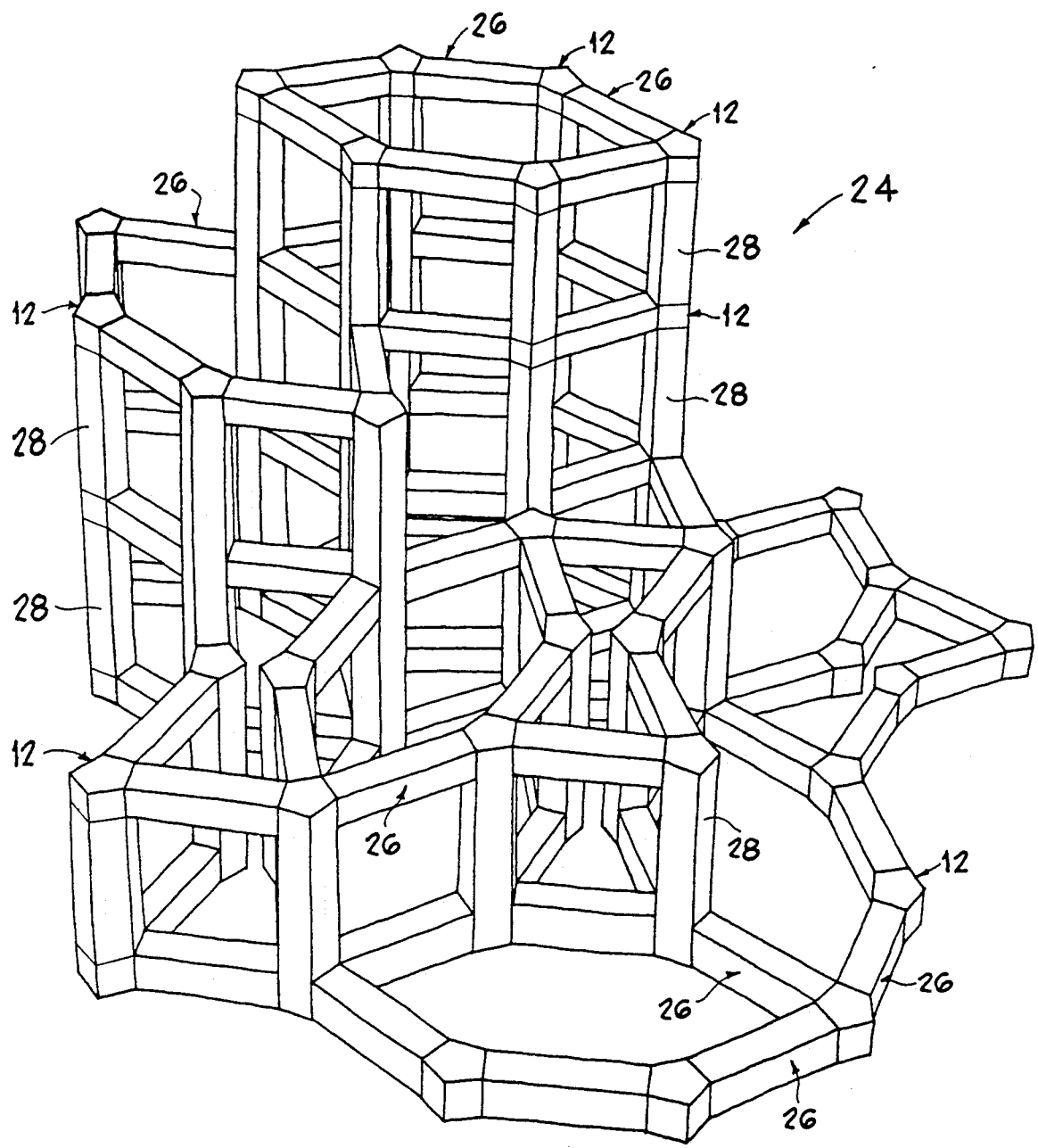
FIG. 3 is a perspective view of a non-periodic, three-dimensional, multi-layered space frame in accordance with the invention formed from five-sided prismatic nodes, with connections between the parallel layers being via perpendicular interconnecting struts.

FIG. 3 shows a perspective view of a non-periodic, three-dimensional, multi-layered space frame 24 in accordance with the invention formed from five-sided prismatic nodes 12 with struts 26 coupling the prismatic nodes together in each layer. Interconnecting the four layers shown in FIG. 3 are a plurality of interconnecting struts 28 which are perpendicular to each layer and interconnect the prismatic nodes in the adjacent layers. As shown, these interconnecting struts 28 are perpendicular to each planar layer; however, they can be tilted at any arbitrary angle.

Figure 4:
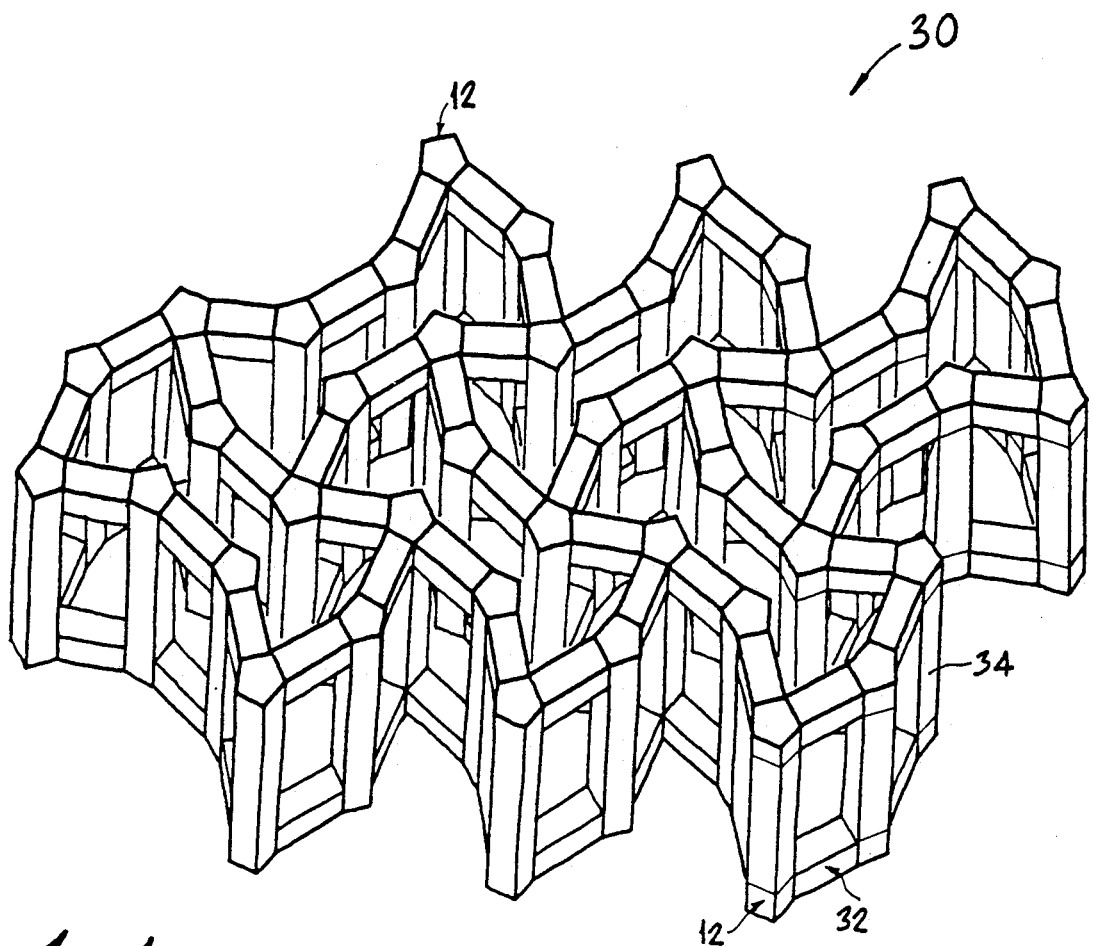
FIG. 4 is a perspective view of a periodic, three-dimensional, double-layered space frame formed from five-sided prismatic nodes, with connections between the parallel layers being via perpendicular interconnecting struts and with the volumes bounded by the struts being ten-sided, non-convex polygonal prisms of one type only.

FIG. 4 illustrates a perspective view of a periodic, three-dimensional double-layered space frame 30 in accordance with the invention formed from the five-sided prismatic nodes 12 with struts 32 coupling the prismatic nodes together in each layer and interconnecting struts 34 interconnecting prismatic nodes in adjacent layers. Once again, these interconnecting struts are shown as being perpendicular to each of the layers. Rather than forming the prismatic nodes in each layer and the interconnecting struts as separate pieces, they can be integrally formed and coupled with the struts 32.

Figure 5:
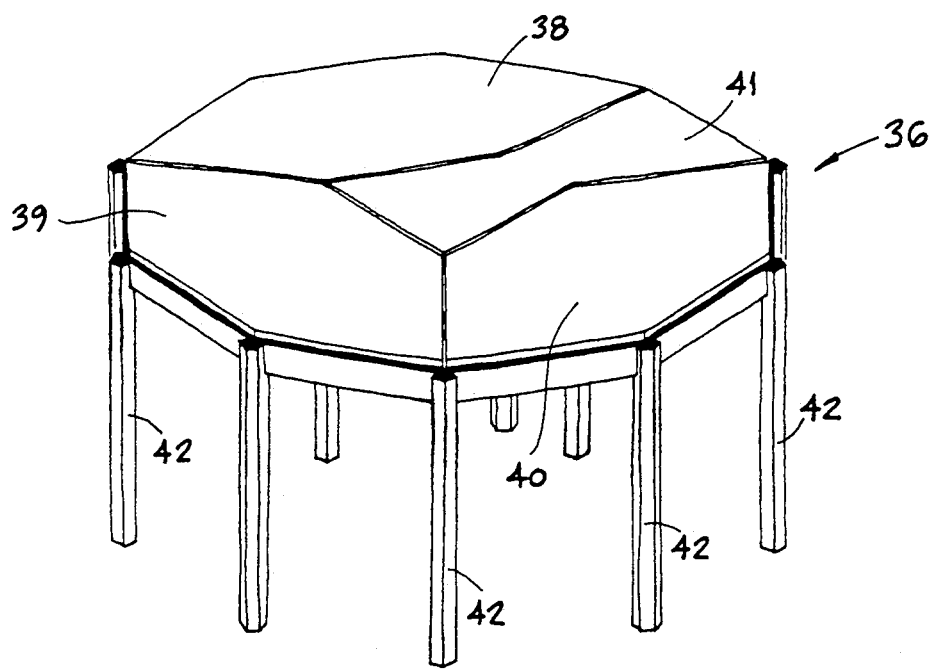
FIG. 5 is a perspective view of polygonal infills on a layer formed from five-sided prismatic nodes.
Figure 6:
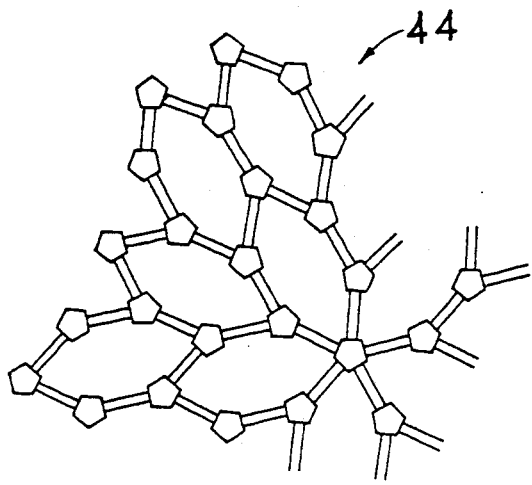
FIGS. 6-10 are top plan views of five examples of two-dimensional space frames with five-sided prismatic nodes and struts of equal length in non-periodic arrays, FIGS. 6 and 10 also having central symmetry.
Figure 9:
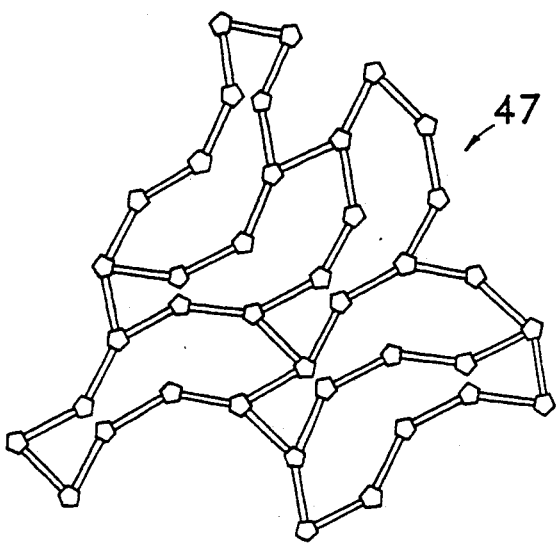
Figure 8:
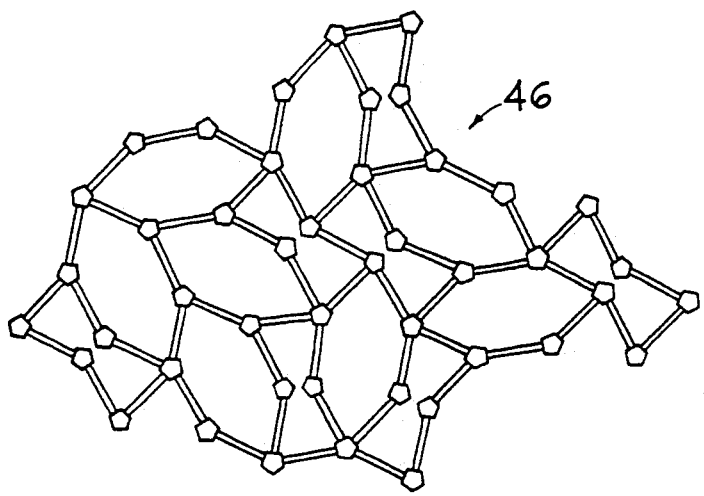
Figure 7:
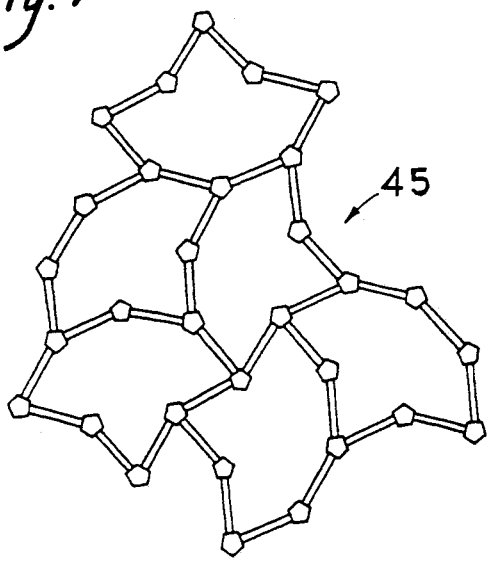
Figure 10:
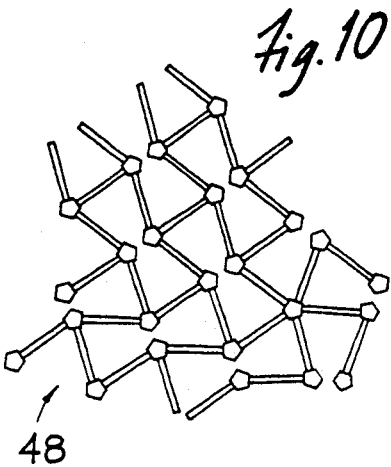

FIG. 5 shows a layer 36 in accordance with the invention formed from and defined by 5-sided prismatic nodes in-filled with hexagonal polygonal tiles 38-40 and having vertically oriented struts 42 extending downwardly therefrom, the tiles filling a surface, the edges therebetween being defined by strut locations and the vertices between edges being defined by node locations.

FIGS. 6-10 show top plan views of five additional examples of two-dimensional space frames 44-48 with five-sided prismatic nodes and a plurality of struts of equal length in non-periodic arrays. Note that the space frames in FIGS. 6 and 10 also have central symmetry around point C.

Figure 11:
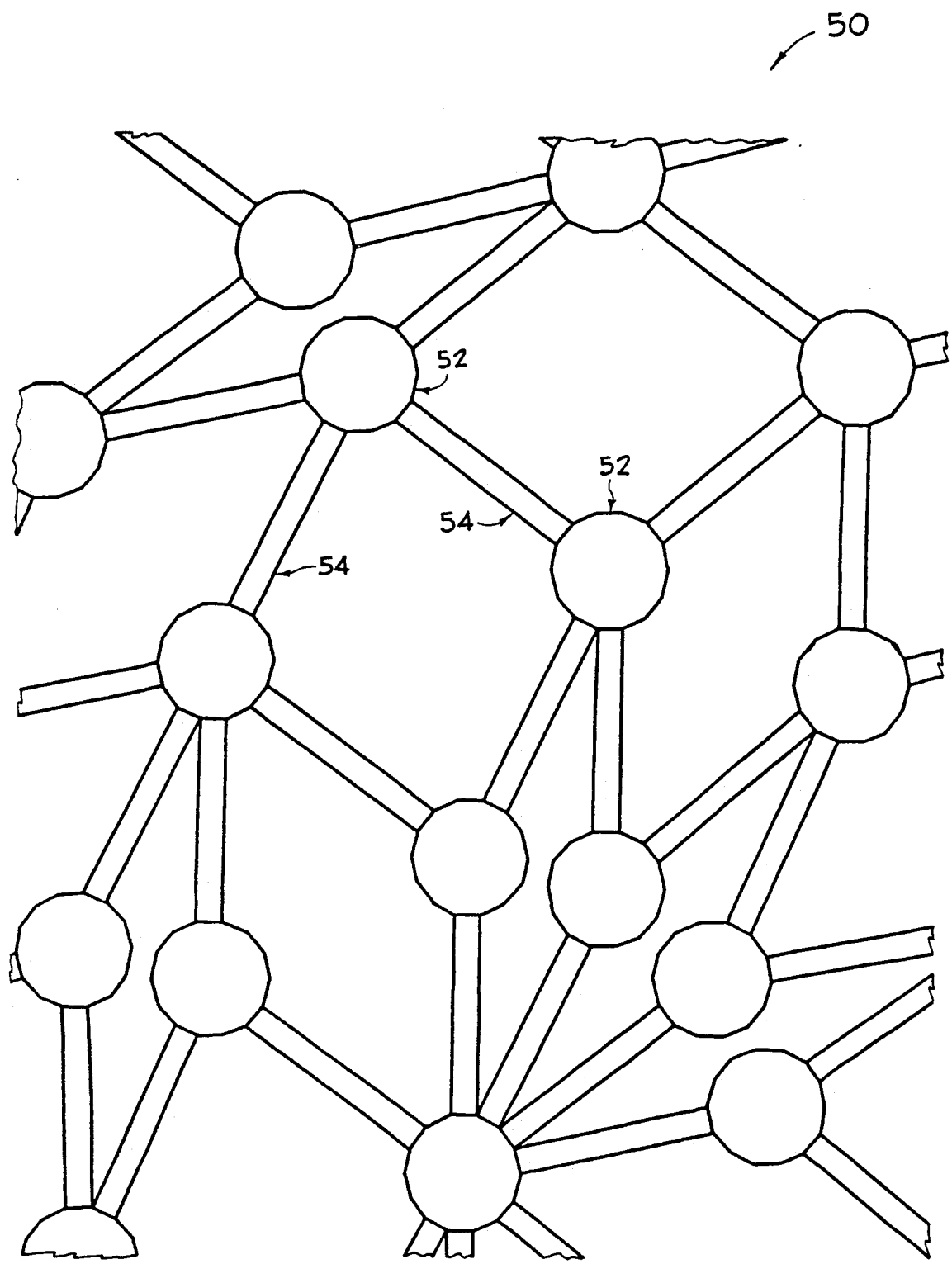
FIG. 11 is a top plan view of a non-periodic two-dimensional space frame with 14-sided prismatic nodes, the areas bounded by the struts being various equal-edged rhombii.

FIG. 11 shows a top plan view of a non-periodic two-dimensional space frame 50 with fourteen-sided prismatic nodes 52 and struts 54 coupling the nodes together. The areas bounded by the struts 54 include various equal-edged rhombii.

Figure 12:
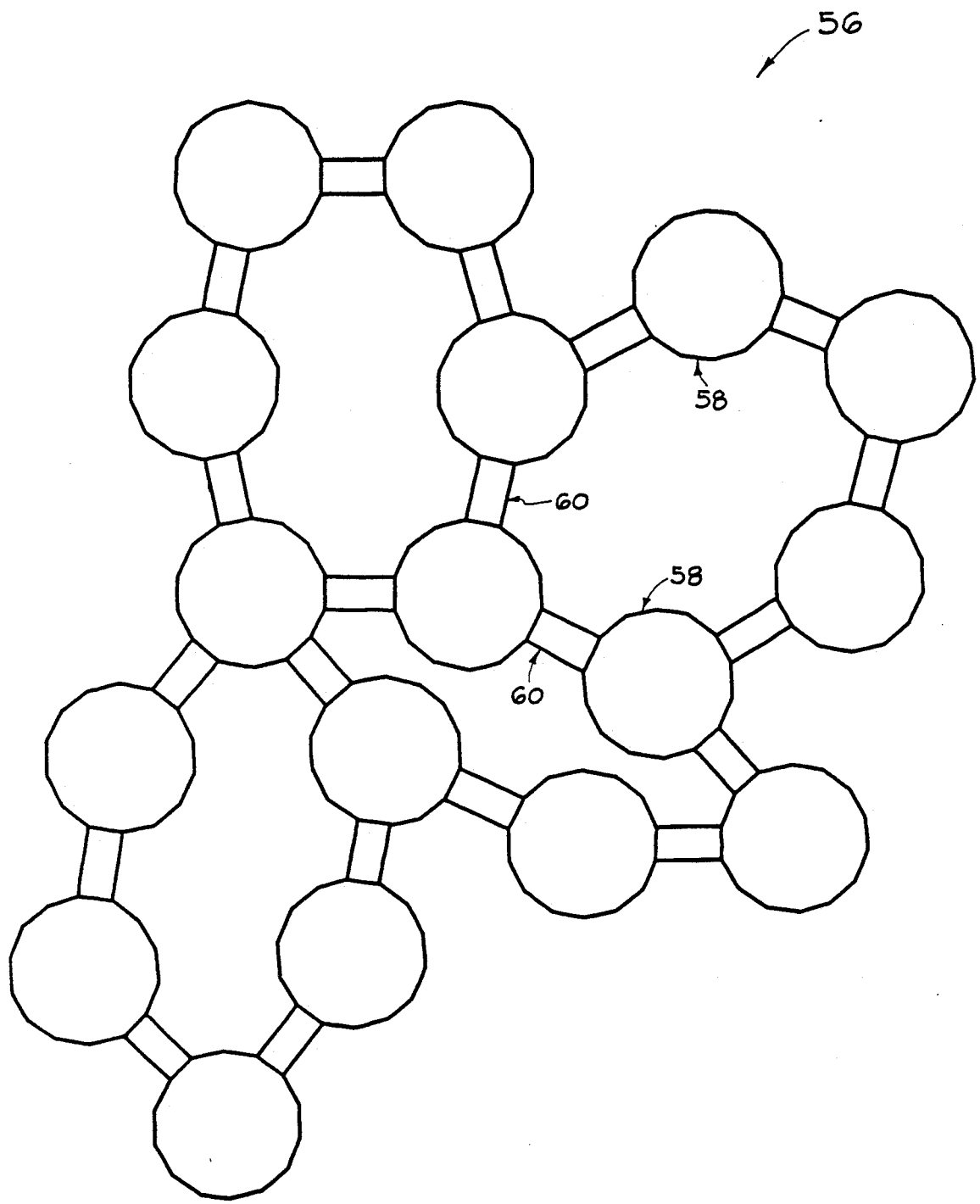
FIG. 12 is a top plan view of a non-periodic, two-dimensional space frame with 14-sided prismatic nodes, the areas bounded by the struts being various convex hexagons with equal edges.

FIG. 12 shows a top plan view of another non-periodic two-dimensional space frame 56 with fourteen-sided prismatic nodes 58 coupled by struts 60, the areas bounded by the struts being various convex hexagons with equal edges.

FIGS. 13a–e show diagrammatic illustrations of the five classes of symmetries of strut directions from odd-sided prismatic nodes, with five-sided nodes being shown on the right. The even sided prismatic nodes also have these five classes of symmetries shown on the left plus the two more shown in FIGS. 14c and 14d where the prismatic node is ten-sided. In FIGS. 13a–e, the strut directions emanate from the center of each prismatic node and end at the edges, vertices or surfaces thereon. As illustrated in FIGS. 13a–e, reference numeral 12 represents a five-sided node while reference numeral 62 represents a six-sided node. For the five-sided node 12, there are side surfaces 64–68 and for the six-sided node there are side surfaces 70–75. The five-sided node 12 has a top surface 77 and a bottom surface 78 while the six-sided node 62 has a top surface 80 and a bottom surface 81. All of these surfaces are planar and the side surfaces are either rectangular or square, the top and bottom surfaces being pentagonal or hexagonal. Node 12 has a center point 69 and node 62 has a center point 63.

Referring now to FIGS. 14a–e, shown therein are diagrammatic illustrations of five examples of strut directions from a ten-sided prismatic node 84. FIGS. 14c and 14d show new symmetries possible only for even-sided nodes and FIGS. 14a and 14b are variations of FIG. 13d for a ten-sided node. FIG. 14b shows a planar two-dimensional node and FIG. 14e shows a hybrid combination of points with five points at the top, five points at the mid-plane, and five points at the bottom.

In FIGS. 14a–e, the center point of the node is designated by reference numeral 86 and the node includes side surfaces 88–97, top surface 98 and bottom surface 99.

FIG. 15 shows a diagrammatic perspective illustration of a double-layered space frame 100 including five-sided prismatic nodes 102, which are diagrammatically shown, these nodes being coupled via struts 104 in the same layer but interconnected through adjacent layers via tilted interconnecting struts 106. In FIG. 15, reference character A represents a hexagonal area while reference character B represents a tilted hexagonal prism. FIG. 15 also represents a solid, volume-filled space structure formed from a plurality of interengaged and continuous blocks, each block having edges defined by strut locations and vertices between edges defined by node locations.

FIG. 16 shows a diagrammatic perspective illustration of a double-layered space frame 110 which is similar to that shown in FIG. 15 regarding hexagonal prism B except that the interconnecting struts are perpendicular to each planar layer. In FIG. 16, the prismatic nodes are represented by reference numerals 112, the struts coupling the nodes 112 are designated by reference numerals 114 and the perpendicular interconnecting struts are represented by reference numerals 116.

FIG. 17 shows a diagrammatic perspective illustration of a non-periodic, multi-layered space frame 118 including five-sided prismatic nodes 120. These nodes are coupled together in each layer via struts 122 and each layer has tilted or perpendicular interconnecting struts 124 and 124' located therebetween and interconnecting the layers together.

FIG. 18 is merely a diagrammatic perspective illustration of a column of layers below hexagon A as seen in FIG. 17.

FIG. 19 shows a perspective view of the right hexagonal prism or space frame 110 shown in FIG. 16 with six diagonal bars 126–131 used to reinforce the sides thereof.

FIG. 20 is an elevational view of the diagonal bracing or bar 126 shown in FIG. 19.

FIGS. 21 and 22 show top plan views of triangular bracing of hexagon A as seen in FIG. 17. In FIG. 21, the bars are 134–136 and in FIG. 22, the bars are 138–140. 17 and 18 is shown with diagonal bars 142–147.

In FIG. 24, a side elevational view shows one parallelogram from FIG. 23 including diagonal bar 147.

In FIG. 25, a tiled, continuous surface 148 is shown comprising tiles 149 and 150 where the tile edges 151 are defined by strut locations in accordance with the invention and the vertices 152 between the edges 151 are defined by prismatic node locations in accordance with the invention. In the lower half of FIG. 25, the nodes 152' have been added for illustration purposes. When the tiles are placed into interengagement, and edge to edge and fill a plane, essentially the strut widths become zero and the node configuration becomes a point at engaging vertices.

As used herein, a "periodic" array is meant to include arrays wherein the bound polygonal areas are never regular polygons by themselves or in combination with other regular polygons, but are convex and/or non-convex polygons with equal and parallel edges and angles as whole number multiples of 360°/p, and therefore excludes areas of regular polygons and combinations of regular polygons.

While various advantageous embodiments have been chosen to illustrate the invention, it will be understood by those skilled in the art that various changes and modifications can be made therein without departing from the scope of the invention as defined in the appended claims.

What is claimed is:

1. A space frame, the combination comprising:
   a plurality of prismatic nodes arranged in a first spaced, non-periodic, planar array, each of said prismatic nodes having a substantially continuous outer surface comprising a top surface and a bottom surface, each being identical regular polygons with p-sides, and p-side surfaces having opposite edges,
   each of said side surfaces being coupled to said top and bottom surfaces, and each opposite edge of each of said side surfaces being coupled to a respective opposite edge of an adjoining side surface;
   a plurality of struts of substantially equal length located in the same plane as said planar array of prismatic nodes, each of said struts having opposite ends; and
   means, coupled to each of said struts and each of said prismatic nodes, for coupling the opposite ends of each strut to two adjacent prismatic nodes to form at least one set of identical polygonal areas bounded by said struts and nodes, thereby forming a continuous space frame having a pattern defined by said polygonal areas that does not repeat and does not have translational symmetry,
   wherein the angle between any given pair of struts connected to the same prismatic node is determined by the angle between the respective p-side surfaces to which the struts are coupled, and
   wherein p is selected from the group consisting of the odd numbers greater than three and the even numbers greater than six.

2. A space frame according to claim 1, wherein each of said side surfaces is rectangular.

3. A space frame according to claim 1, wherein each of said side surfaces is square.

4. A space frame according to claim 1, wherein each of said struts are substantially straight.

5. A space frame according to claim 1, wherein p equals five.

6. A space frame according to claim 1 wherein p equals 14.

7. A space frame according to claim 1 and further comprising:
   at least a second plurality of prismatic nodes arranged in at least a second spaced, planar array, each of said second plurality of prismatic nodes having a continuous outer surface comprising a top surface, a bottom surface, and p-side surfaces having opposite edges,
   each of said side surfaces in said second array being coupled to said top and bottom surfaces in each of said prismatic nodes in said second array, and each opposite edge of each of said side surfaces in said second array being coupled to a respective opposite edge of an adjoining side surface, at least a second plurality of struts located in the same plane as said second planar array of prismatic nodes, each of said struts having opposite ends, at least second means, coupled to each of said struts and each of said prismatic nodes in said second planar array, for coupling the opposite ends of each strut to two adjacent prismatic nodes in said second planar array, a plurality of interconnecting struts extending from said first planar array to said second planar array, each of said interconnecting struts having opposite ends, and means, coupled to each of said interconnecting struts and to each of said prismatic nodes located in each of said first and second planar arrays, for coupling the opposite ends of each interconnecting strut to a prismatic node located in each of said first and second planar arrays.

8. A space frame according to claim 7, wherein each of said top and bottom surfaces are identical in configuration and comprise regular polygons with p-sides, and
each of said side surfaces is rectangular.

9. A space frame according to claim 7, wherein each of said top and bottom surfaces are identical in configuration and comprise regular polygons with p-sides, and
each of said side surfaces is square.

10. A space frame according to claim 7, wherein each of said struts have substantially the same length.

11. A space frame according to claim 7, wherein each of said struts are substantially straight.

12. A space frame according to claim 7, wherein p equals five.

13. A space frame according to claim 7, wherein p equals 14.

14. A space frame according to claim 7, wherein said interconnecting struts are each substantially perpendicular to said first and second planar arrays.

15. A space frame according to claim 1, wherein a plurality of closed areas are bounded by said struts and said closed areas comprise convex polygons.

16. A space frame according to claim 1, wherein a plurality of closed areas are bounded by said struts and said closed areas comprise non-convex polygons.

17. A space frame according to claim 7, wherein each of said prismatic nodes in said first and second plurality of prismatic nodes has a center; and
the directions of said struts relative to the center of said prismatic nodes lie on the horizontal plane mid-way through the node and include;
(a) p directions of lines joining the mid-points of p rectangular surfaces,
(b) p directions of lines joining the mid-points of p vertical edges,
(c) p directions of lines with p-fold or 2p-fold symmetry in any position between (a) and (b),
(d) the p/2 directions of lines, for an even p, to the mid-points of surfaces, edges or therebetween, or
(e) any combination of directions from (a), (b), (c) or (d).

18. A space frame according to claim 7, wherein each of said prismatic nodes in said first and second plurality of prismatic node has a center; and
the directions of said struts relative to the center of said prismatic nodes and the top, bottom, or both surfaces include;
(a) p directions of lines to the p vertices of the surfaces,
(b) p directions of lines to the p edges of the surfaces,
(c) directions of lines, with p-fold or 2p-fold symmetry in any position between (a) and (b),
(d) one direction to the mid-point of the surfaces,
(e) p directions of lines having p-fold or 2p-fold symmetry in any position between the mid-face and the vertex or edge of the surfaces,
(f) p/2 directions of lines, for an even p, to any in-between positions on the surfaces or their edges, or
(g) any combinations of (a)-(f).

19. A space frame, the combination comprising:
a first plurality of prismatic nodes arranged in a first spaced, non-periodic, planar array, each of said prismatic nodes having a substantially continuous outer surface comprising a top surface, a bottom surface, and p-side surfaces having opposite edges,
each of said side surfaces being coupled to said top and bottom surfaces, and each opposite edge of each of said side surfaces being coupled to a respective opposite edge of an adjoining side surface;
a first plurality of struts of substantially equal length located in the same plane as said first planar array of prismatic nodes, each of said struts having opposite ends;
means, coupled to each of said struts and each of said prismatic nodes, for coupling the opposite ends of each strut to two adjacent prismatic nodes to form at least one set of identical polygonal areas bounded by said struts and nodes, thereby forming a continuous space frame having a pattern defined by said polygonal areas that does not repeat and does not have translational symmetry;
at least a second plurality of prismatic nodes arranged in at least a second spaced, planar array, each of said second plurality of prismatic nodes having a continuous outer surface comprising a top surface, a bottom surface, and p-side surfaces having opposite edges,
each of said side surfaces in said second array being coupled to said top and bottom surfaces in each of said prismatic nodes in said second array, and being coupled to the two side surfaces on the opposite edges thereof in said second array;
a second plurality of struts extending from said first planar array to said second planar array, each of said struts having opposite ends; and
means, coupled to each of said second plurality of struts and to each of said prismatic nodes located in each of said first and second planar arrays, for coupling the opposite ends of each strut to a prismatic node located in each of said first and second planar arrays;
wherein p is selected from the group consisting of the odd numbers greater than three and the even numbers greater than six.

20. A space structure, the combination comprising:
a plurality of substantially planar, polygonal tiles, each having edges and vertices between adjacent edges, said tiles being engaged together to fill a substantially planar space, the location of said vertices and said edges being defined by the pattern of a plurality of prismatic nodes arranged in a first spaced, planar, non-periodic array, each of said prismatic nodes having a substantially continuous outer surface comprising a top surface and a bottom surface, each being identical regular polygons with p-sides, and p-side surfaces having opposite edges, each of said side surfaces being coupled to said top and bottom surfaces, and each opposite edge of each of said side surfaces being coupled to a respective opposite edge of an adjoining side surface, a plurality of struts of substantially equal length located in the same plane as said planar array of prismatic nodes, each of said struts having opposite edge, and means, coupled to each of said struts and each of said prismatic nodes, for coupling the opposite ends of each strut to two adjacent prismatic nodes to form at least one set of identical polygonal areas bounded by said struts and nodes, thereby forming a continuous space frame having a pattern defined by said polygonal areas that does not repeat and does not have translational symmetry, each strut defining a line extending into each adjacent prismatic node and the lines extending into each node intersecting at an intersection, wherein the angle between any given pair of struts connected to the same prismatic node is determined by the angle between the respective p-side surfaces to which the struts are coupled, wherein p is selected from the group consisting of the odd numbers greater than three and the even numbers greater than four, and wherein each edge of each tile is adapted to overlie one of said lines defined by one of said struts and each vertex of each tile is adapted to be co-axial with a vertical axis passing through a respective intersection.

21. A space structure, the combination comprising:

a plurality of polyhedral blocks, each having top and bottom surfaces and side surfaces interconnecting the top and bottom surfaces and each top, bottom and side surface having edges and vertices between intersecting edges, said blocks being engaged together to fill a volume, the location of said vertices and said edges being defined by the pattern of a plurality of prismatic nodes arranged in a first spaced, planar, non-periodic array, each of said prismatic nodes having a substantially continuous outer surface comprising:

a top surface and a bottom surface, each being identical regular polygons with p-sides, and p-side surfaces having opposite edges, each of said side surfaces being coupled to said top and bottom surfaces, and being coupled to the two side surfaces on the opposite edges thereof, a plurality of struts of substantially equal length located in the same plane as said planar array of prismatic nodes, each of said struts having opposite ends, means, coupled to each of said struts and each of said prismatic nodes, for coupling the opposite ends of each strut to two adjacent prismatic nodes to form at least one set of identical polygonal areas bounded by said struts and nodes, thereby forming a continuous space frame having a pattern defined by said polygonal areas that does not repeat and does not have translational symmetry, each strut defining a line extending into each adjacent prismatic node and the lines extending into each node intersecting at an intersection, wherein the angle between any given pair of struts connected to the same prismatic node is determined by the angle between the respective p-side surfaces to which the struts are coupled, at least a second plurality of prismatic nodes arranged in at least a second spaced, planar array, each of said second plurality of prismatic nodes having a continuous outer surface comprising a top surface, a bottom surface, and p-side surfaces having opposite edges, each of said side surfaces in said second array being coupled to said top and bottom surfaces in each of said prismatic nodes in said second array, and being coupled to the two side surfaces on the opposite edges thereof in said second array, at least a second plurality of struts located in the same plane as said second planar array of prismatic nodes, each of said struts having opposite ends, at least second means, coupled to each of said struts and each of said prismatic nodes in said second planar array, for coupling the opposite ends of each strut to two adjacent prismatic nodes in the said second planar array, each strut defining a line extending into each adjacent prismatic node and the lines extending into each node intersecting at an intersection, wherein each edge of each top and bottom surface of each polyhedral block is adapted to overlie one of said lines defined by one of said struts, and each vertex of each top and bottom surface of each polyhedral block is adapted to be co-axial with a vertical axis passing through a respective intersection, a plurality of interconnecting struts extending from said first planar array to said second planar array, each of said interconnecting struts having opposite ends, and means, coupled to each of said interconnecting struts and to each of said prismatic nodes located in each of said first and second planar arrays, for coupling the opposite ends of each interconnecting strut to a prismatic node located in each of said first and second planar arrays, each of said interconnecting struts defining a line, wherein each edge of each side surface of each polyhedral block is adapted to overlie one of said lines defined by one of said interconnecting struts, and wherein p is selected from the group consisting of the odd numbers greater than three and the even numbers greater than four.

22. A space frame, the combination comprising:

a plurality of prismatic nodes arranged in a first spaced, periodic, planar array, each of said prismatic nodes having a substantially continuous outer surface comprising a top surface, a bottom surface, and p-side surfaces having opposite edges, each of said side surfaces being coupled to said top and bottom surfaces, and each opposite edge of each of said side surfaces being coupled to a respective opposite edge of an adjoining side surface;

a plurality of struts of substantially equal length located in the same plane as aid planar array of prismatic nodes, each of said struts having opposite ends; and means, coupled to each of said struts and each of said prismatic nodes, for coupling the opposite ends of each strut to two adjacent prismatic nodes to form at least one set of identical polygonal areas bounded by said struts and nodes, thereby forming a continuous space frame having a pattern defined by said polygonal areas that repeats and has translational symmetry, wherein p is selected from the group consisting of the odd numbers greater than three and the even numbers greater than eight.

* * * * *

UNITED STATES PATENT AND TRADEMARK OFFICE
CERTIFICATE OF CORRECTION

PATENT NO. : 5,007,220

DATED : April 16, 1991

INVENTOR(S) : Lalvani

It is certified that error appears in the above-identified patent and that said Letters Patent is hereby corrected as shown below:

On the title page item [76], change "92 Horatio St., #3M," to --164 Bank Street, Apt. 2B--.

Signed and Sealed this

Twentieth Day of August, 1991

*Attest:*

HARRY F. MANBECK, JR.

*Attesting Officer*  *Commissioner of Patents and Trademarks*